Kindleberger & Arnold,
Hinge.
No. 94,756. Patented Sep. 14, 1869.
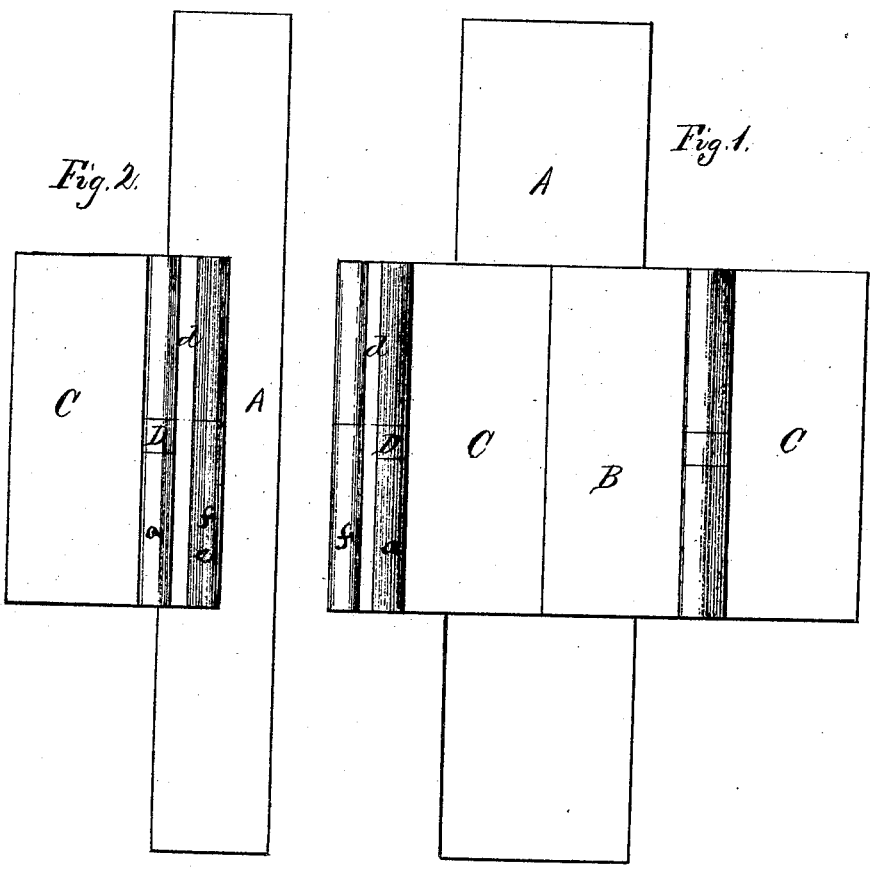
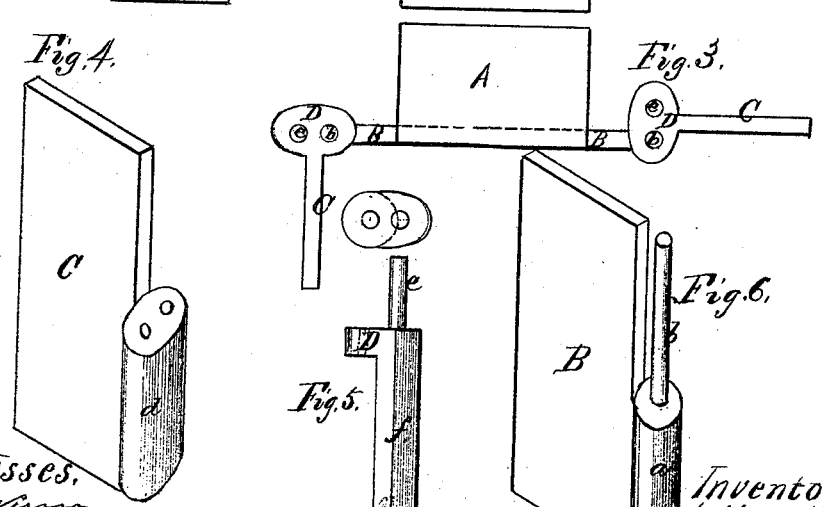
Witnesses,
Inventor
Jefferson Kindleberger
William Augustus Arnold

United States Patent Office.

JEFFERSON KINDLEBERGER AND WILLIAM AUGUSTUS ARNOLD, OF SAN FRANCISCO, ASSIGNORS TO "THE INVENTORS' ASSOCIATION OF SAN FRANCISCO, CALIFORNIA."

Letters Patent No. 94,756, dated September 14, 1869.

IMPROVED REVERSIBLE BUT.

The Schedule referred to in these Letters Patent and making part of the same.

*To all whom it may concern:*

Be it known that we, JEFFERSON KINDLEBERGER and WILLIAM AUGUSTUS ARNOLD, of the city and county of San Francisco, State of California, have invented an Improved Reversible Loose-Joint Door-But; and we do hereby declare the following description and accompanying drawings are sufficient to enable any person skilled in the art or science to which it most nearly appertains, to make and use our said invention or improvements, without further invention or experiment.

The nature of our invention consists in the arrangement of a detachable washer, and, in combination with it, of two pintles, as hereinafter described.

The following description, in which we refer to the accompanying drawings, forming a part of this specification, fully describes our invention, its manner of construction, and operation.

In the drawings—

Figure 1 is a view of a pair of buts, having one leaf secured to a piece of wood.

Figure 2 shows a back view of one of the buts, the leaves partly closed.

Figure 3 is a sectional view, taken through $x$ $x$.

Figures 4, 5, and 6 are detail views.

Like letters indicate identical parts wherever they occur in each of the drawings.

A is a piece of wood, to which the buts are represented as secured.

The leaf B, shown at fig. 6, is constructed similar to the leaves of any of the ordinary door-buts, having the cylindrical lug $a$ extending from one end to near the middle of the leaf.

A stationary pintle, $b$, projects upward from the upper end of the lug $a$.

The leaf C is provided with a lug, $d$, which is made in the form of an ellipse, and which also extends to near the middle of the leaf.

This lug is attached to the leaf in such a manner, that if the leaf were extended sidewise it would cut the ellipse through the middle, longitudinally, and is provided with two holes or sockets, one on each end of the ellipse, and each extending the entire length of the lug, as shown at fig. 4.

As before stated, the two lugs $a$ and $d$ do not meet in the middle of the but, and in order to fill up this space, I use an elliptical washer, D, having a semicircular projection, $f$, which fits around the cylindrical lug $a$ on the leaf B, thus giving to the lug $a$ an elliptical form also, when the washer is in place.

The elliptical washer is provided with a hole at one end of the ellipse, and a short pintle, $e$, at the opposite end, so that by entering the pintle $b$ of the leaf B in the hole in the washer, and slipping the washer down upon the cylindrical lug $a$, a sufficient addition is made to the lug to give it the same form as the lug $d$ on the leaf C, the washer turning upon the pintle $b$.

By fitting the leaf C with leaf B, so that its two holes or sockets will receive the two pintles $b$ and $e$, the but is put together in working-condition.

When thus put together, the leaf C and washer D, with its projection $f$, turn upon the pintle $b$ and around the cylindrical lug $a$ of the leaf B.

To change the but so as to cause it to open in a direction contrary to that in which it is set, or, in other words, to change it from a right to a left-hand but, it is only necessary to remove the leaf C and change the position of the pintles, so that the short pintle will enter the hole in the lug $d$ from which the long one was removed, and the long pintle will enter the hole from which the short one was removed, thus completely converting it into a but opening in an opposite direction.

The screw-holes in the leaf C are countersunk on both sides, in order to allow the screw to be inserted from either side, as the position of the but requires.

By this means we are enabled to construct a door-but or hinge which possesses greater strength than the ordinary but, while it is much more convenient.

Having thus described our invention, what we claim as new, and desire to secure by Letters Patent, is—

1. The elliptic washer D, with its semicircular projection, $f$, and supplemental pintle $e$, substantially as and for the purpose herein described.

2. Reversing a door-but or hinge so that it will open from either side, by means of a stationary and a movable pintle entering two holes in an elliptical lug on the reversing-leaf, substantially as above specified.

In witness whereof, we have hereunto set our hands and seal.

JEFFERSON KINDLEBERGER. [L. S.]
WILLIAM AUGUSTUS ARNOLD.

Witnesses:
A. M. WINN,
J. L. BOONE.